US010698454B2

(12) United States Patent
Zeng et al.

(10) Patent No.: US 10,698,454 B2
(45) Date of Patent: Jun. 30, 2020

(54) CAMERA ASSEMBLY, ELECTRONIC APPARATUS, AND MOBILE TERMINAL

(71) Applicant: GUANGDONG OPPO MOBILE TELECOMMUNICATIONS CORP., LTD., Dongguan, Guangdong (CN)

(72) Inventors: Zanjian Zeng, Guangdong (CN); Kai Gao, Guangdong (CN); Wuchun Zeng, Guangdong (CN); Xiang Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/190,882

(22) Filed: Nov. 14, 2018

(65) Prior Publication Data

US 2019/0163242 A1    May 30, 2019

(30) Foreign Application Priority Data

Nov. 30, 2017    (CN) .......................... 2017 1 1246004

(51) Int. Cl.
*H04N 5/225*    (2006.01)
*G03B 17/04*    (2006.01)
(Continued)

(52) U.S. Cl.
CPC ........... *G06F 1/1686* (2013.01); *G03B 17/04* (2013.01); *G03B 17/12* (2013.01); *G06F 1/188* (2013.01);
(Continued)

(58) Field of Classification Search
CPC ..... G06F 1/1686; G06F 1/188; H04N 5/2257; H04N 5/2251; H04N 5/2252; G03B 17/04; G03B 17/12
See application file for complete search history.

(56) References Cited

U.S. PATENT DOCUMENTS 4,299,465 A    11/1981    Chan
6,073,903 A    6/2000    Lindsay
(Continued)

FOREIGN PATENT DOCUMENTS

CN    202931406 U    5/2013
CN    203368530 U    12/2013
(Continued)

OTHER PUBLICATIONS

International search report for Application No. PCT/CN2018/115421, dated Jan. 30, 2019 (9 pages).
(Continued)

*Primary Examiner* — Hung G Lam
(74) *Attorney, Agent, or Firm* — Ladas & Parry LLP

(57) ABSTRACT

A camera assembly may include a fixed holder; a support means; a guiding rack, arranged on the fixed holder; a guiding gear rotatably arranged on the support means and movably engaged with the guiding rack; a camera module arranged on the support means and configured to move between a first position at which the camera module extends out of the fixed holder and a second position at which the camera module retracts into the fixed holder with movement of the support means; a chain device rotatable relative to the fixed holder; and a power device comprising an output end coupled to the chain device and configured to drive the chain device to rotate, such that the camera module moves between the first position and the second position. An electronic apparatus and a method for controlling a camera assembly of an electronic apparatus are further provided.

20 Claims, 9 Drawing Sheets

(51) Int. Cl.
 *G06F 1/16* (2006.01)
 *G03B 17/12* (2006.01)
 *G06F 1/18* (2006.01)
(52) U.S. Cl.
 CPC ......... *H04N 5/2251* (2013.01); *H04N 5/2252* (2013.01); *H04N 5/2257* (2013.01)

(56) References Cited

U.S. PATENT DOCUMENTS

| | | | | |
|---|---|---|---|---|
| 9,094,591 | B2* | 7/2015 | Codd | B66F 11/048 |
| 9,692,953 | B2* | 6/2017 | Xiong | G03B 11/043 |
| 2002/0081110 | A1 | 6/2002 | Johnson et al. | |
| 2002/0137554 | A1* | 9/2002 | Hanna | H04M 1/15 455/575.5 |
| 2006/0050018 | A1* | 3/2006 | Hutzel | B60K 35/00 345/60 |
| 2011/0025908 | A1 | 2/2011 | Lin et al. | |
| 2015/0189175 | A1* | 7/2015 | Fan | H04N 5/2251 348/37 |
| 2016/0191760 | A1* | 6/2016 | Wu | H04N 5/2251 348/262 |
| 2016/0243988 | A1* | 8/2016 | Peterson | B60R 1/072 |
| 2017/0064166 | A1 | 3/2017 | Xiong et al. | |
| 2018/0262663 | A1* | 9/2018 | Zhang | G03B 29/00 |

FOREIGN PATENT DOCUMENTS

| | | |
|---|---|---|
| CN | 104023105 A | 9/2014 |
| CN | 204244338 U | 4/2015 |
| CN | 204408434 U | 6/2015 |
| CN | 104935820 A | 9/2015 |
| CN | 105187700 A | 12/2015 |
| CN | 105516556 A | 4/2016 |
| CN | 205792925 U | 12/2016 |
| CN | 106506913 A | 3/2017 |
| CN | 106657456 A | 5/2017 |
| CN | 106790833 A | 5/2017 |
| CN | 106911883 A | 6/2017 |
| CN | 206251153 U | 6/2017 |
| CN | 106993125 A | 7/2017 |
| CN | 206302443 U | 7/2017 |
| CN | 107087093 A | 8/2017 |
| CN | 107197133 A | 9/2017 |
| CN | 104754215 B | 10/2017 |
| CN | 107295129 A | 10/2017 |
| CN | 107370847 A | 11/2017 |
| DE | 102016013511 A1 | 10/2017 |
| EP | 1571807 A1 | 9/2005 |
| KR | 1020090103421 A | 10/2009 |
| WO | WO9630693 A1 | 10/1996 |
| WO | WO2015163571 A1 | 10/2015 |

OTHER PUBLICATIONS

European search report for Application No. EP 18207194.4, dated Feb. 18, 2019 (8 pages).

European examination report in corresponding European Application No. 18207194.4, dated Mar. 5, 2020 (4 pages).

* cited by examiner

US 10,698,454 B2

CAMERA ASSEMBLY, ELECTRONIC APPARATUS, AND MOBILE TERMINAL

CROSS REFERENCE TO RELATED APPLICATIONS

This application claims priorities to Chinese Patent Application No. 201711246004.8, filed on Nov. 30, 2017, the contents of which are herein incorporated by reference in their entireties.

TECHNICAL FIELD

The described embodiments relate to electronic products, and in particular to a camera assembly, an electronic apparatus with the camera assembly, and a mobile terminal with the camera assembly.

BACKGROUND

Front camera module of a current mobile terminal is covered by a screen. It is necessary to define a hole for the camera module on a glass substrate of the screen for lights to penetrate through, that is, the front camera module may occupy a space of the screen. As a result, the ratio of a display area of the screen to an area of the screen is reduced, and it is difficult for the mobile terminal to achieve full screen.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
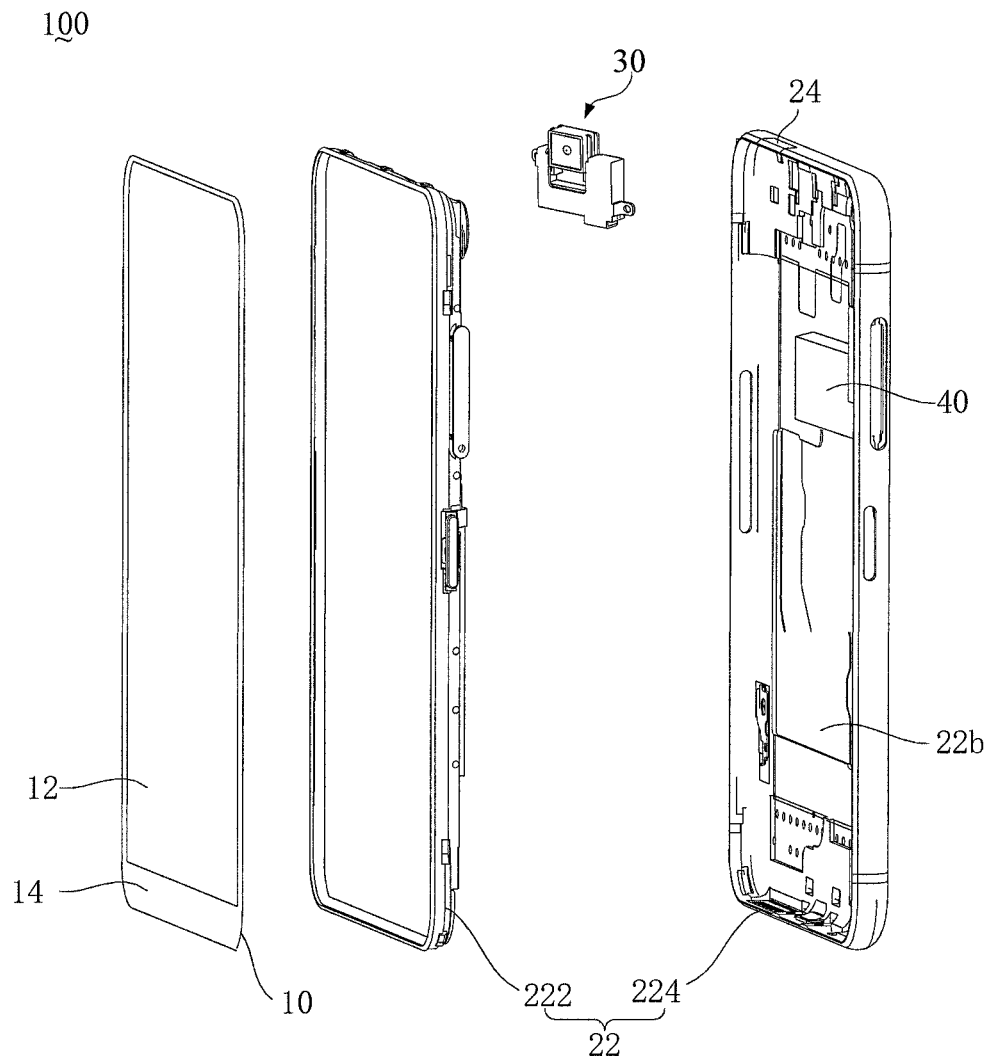
FIG. 1 is an exploded isometric view of an electronic apparatus according to some embodiments of the present disclosure.

In order to more clearly understand the objective, the features and advantages of the present disclosure, the present disclosure will be described in details with reference to the drawings and the embodiments. It should be noted that, the embodiments and the features recited in the embodiments of the present disclosure may be combined with each other without confliction.

The technical solutions in the embodiments of the present disclosure will be clearly and completely described in detail below with reference to the accompanying drawings in the embodiments of the present disclosure. It should be noted that, the specific embodiments described herein are only for purpose of illustration, rather than limitation. For convenience of description, parts of the structures related to the present disclosure are shown, not all the structures. Based on the embodiments of the present disclosure, one skilled in the art may obtained other embodiments without any inventive work, all these belong to the protection scope of the present disclosure.

Further, the embodiments are described with reference to the accompanying drawings, in order to illustrate specific embodiments of the present disclosure that can be implemented. In the specification, it can be understood that, directional terms recited in the present disclosure, such as "top", "bottom", "upper", "lower", "front", "rear", "left", "right", "inner", "outer", "side", "above", "under", or the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure. In the present disclosure, unless specified or limited, otherwise, terms "mounted", "connected", "coupled", "disposed", "arranged", or the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In addition, terms such as "first", "second", "third", or the like are used herein for purposes of description, and are not intended to indicate or imply relative importance or significance or to imply the number of indicated technical features. Thus, the feature defined with "first", "second", "third", or the like may include one or more of such a feature. In the description of the present disclosure, "a plurality of" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the said element.

In the following, an electronic apparatus 100 provided in embodiments of the present disclosure will be described with reference to drawings.

The electronic apparatus 100 may include intelligent devices such as smart phones, tablet PCs, laptops, smart watches, PDAs (Personal Digital Assistant), personal computers, in-vehicle devices, wearable equipment, or the like. It should be understood that "electronic apparatus 100" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic apparatus may also include a satellite or cellular telephone, a personal communication system terminal with cellular radio telephone and data processing, facsimile and data communication, beeper, or other electronic apparatuses with a transceiver.

Figure 2:
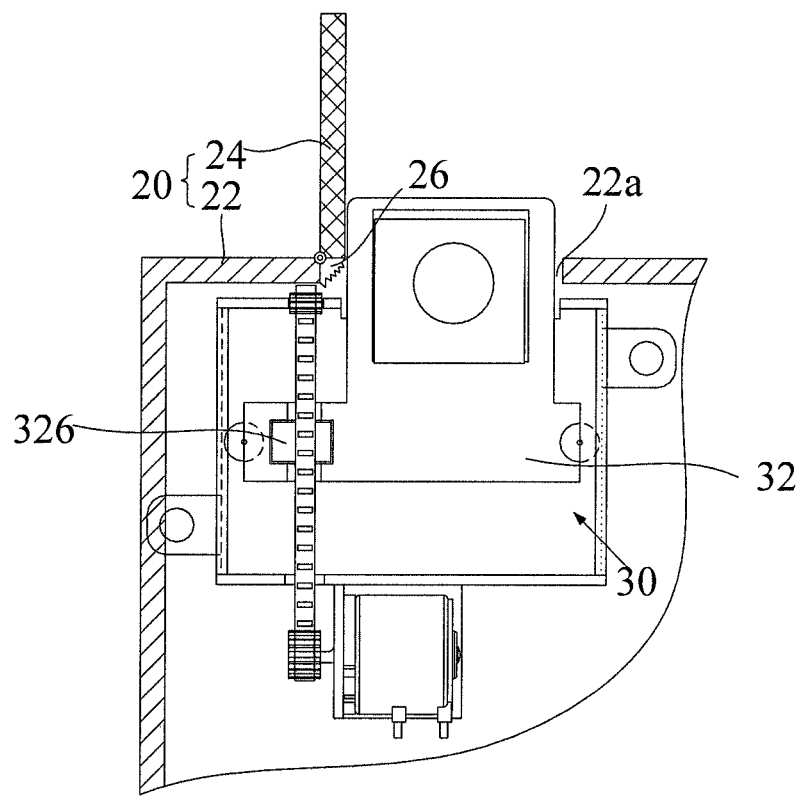
FIG. 2 is a partial cross-sectional view of the electronic apparatus according to some embodiments of the present disclosure.

Referring to FIGS. 1-2, the electronic apparatus 100, according to an exemplary embodiment, may include a screen 10, a housing assembly 20, a camera assembly 30, and a controller 40 electrically connected to the camera assembly 30. The screen 10 may be embedded in the housing assembly 20. The camera assembly 30 and the controller 40 may be disposed in the housing assembly 20 and under the screen 10.

As shown in FIG. 1, the screen 10, according to an exemplary embodiment, may include a display area 12 and a non-display area 14. The display area 12 may be configured to display information such as images, videos, texts, or the like. The non-display area 14 may be configured to provide a reserved mounting space for components including but not limited to a receiver, a sensor, or the like.

In some embodiments, the screen 10 may include pixels formed from light-emitting diodes (LEDs), organic LEDs (OLEDs), plasma cells, electrowetting pixels, electrophoretic pixels, liquid crystal display (LCD) components, or other suitable pixel structures. A screen cover layer (not labeled) such as a layer of clear glass or plastic may cover the surface of the screen 10 or the outermost layer of the screen 10 may be formed from a color filter layer, thin-film transistor layer, or other display layer. In this embodiment, the screen 10 may further incorporate touch electrodes and be used as a touch screen for inputting information.

Referring to FIGS. 1-2, the housing assembly 20 may include a housing 22 and a dustproof plate 24 configured to cover the opening 22a. The housing 22, which may sometimes be referred to as a casing, a shell, or the like, may be formed of plastic, glass, ceramics, fiber composites, metal (e.g., stainless steel, aluminum, etc.), other suitable materials, or a combination of these materials. In some situations, parts of housing 22 may be formed from dielectric or other low-conductivity material.

In some embodiments, as shown in FIG. 1, the housing 22 may further include a front shell 222 and a back shell 224. The screen 10 may cover the front shell 222. The front shell 222 may be further fixed with the back shell 224, such that a chamber (not shown) may be defined by the front shell 222 and the back shell 224. The chamber may be configured to receive the camera assembly 30, the controller 40 and other components. In some embodiments, a housing opening 22a may be defined in the housing 22, and a camera module 34 of the camera assembly 30 may extend out of the housing 22 via the housing opening 22a, or retract back into the housing 22 via the housing opening 22a. In some embodiments, the housing opening 22a may be defined in the back shell 224, in other embodiments, the housing opening 22a may be defined in the front shell 222, or may be defined in a middle frame (not shown here) of the electronic apparatus.

The dustproof plate 24 may be connected to the housing 22 by a rebound hinge 26, such that the dustproof plate 24 could rotate relative to the housing 22. When the camera module 34 is moving out of the housing 10, the camera assembly 30 may push the dustproof plate 24 to rotate to move away from the opening 22a, and the camera assembly 30 may extend out of the housing 22 via the housing opening 22a. When the camera module 34 is moving back to the housing 22, the dustproof plate 24 may be automatically bounced back to cover the opening 22a by a rebound force generated by the rebound hinge 26, such that it is possible to prevent external dusts from entering the inner side of the electronic apparatus. The rebound hinge 26 may be a spring, an iron elastic sheet, or other elastic parts.

Figure 3:
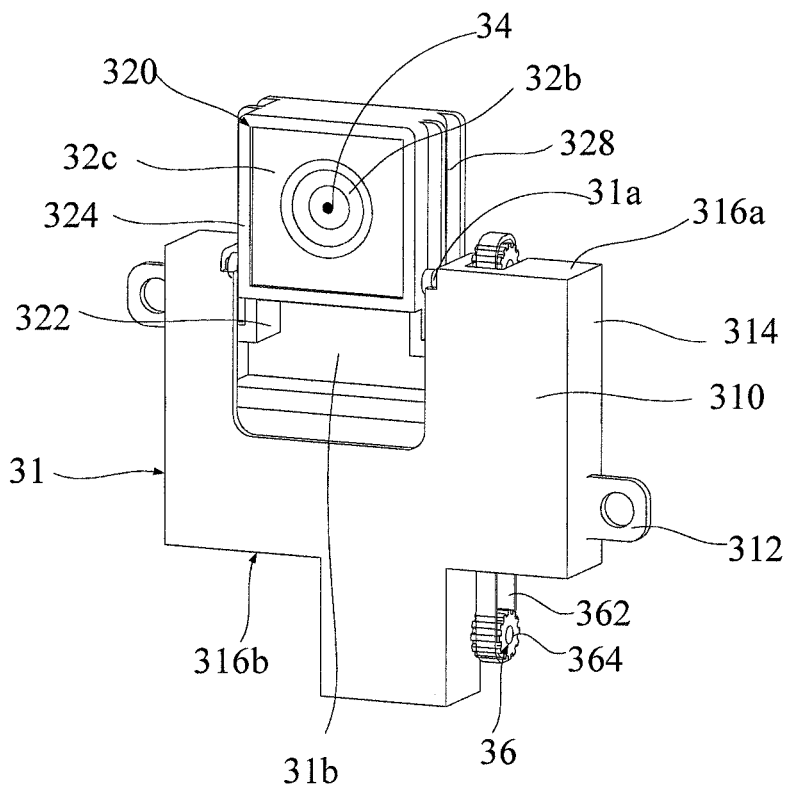
FIG. 3 is an enlarged view of a camera assembly in FIG. 1.
Figures 4, 5:
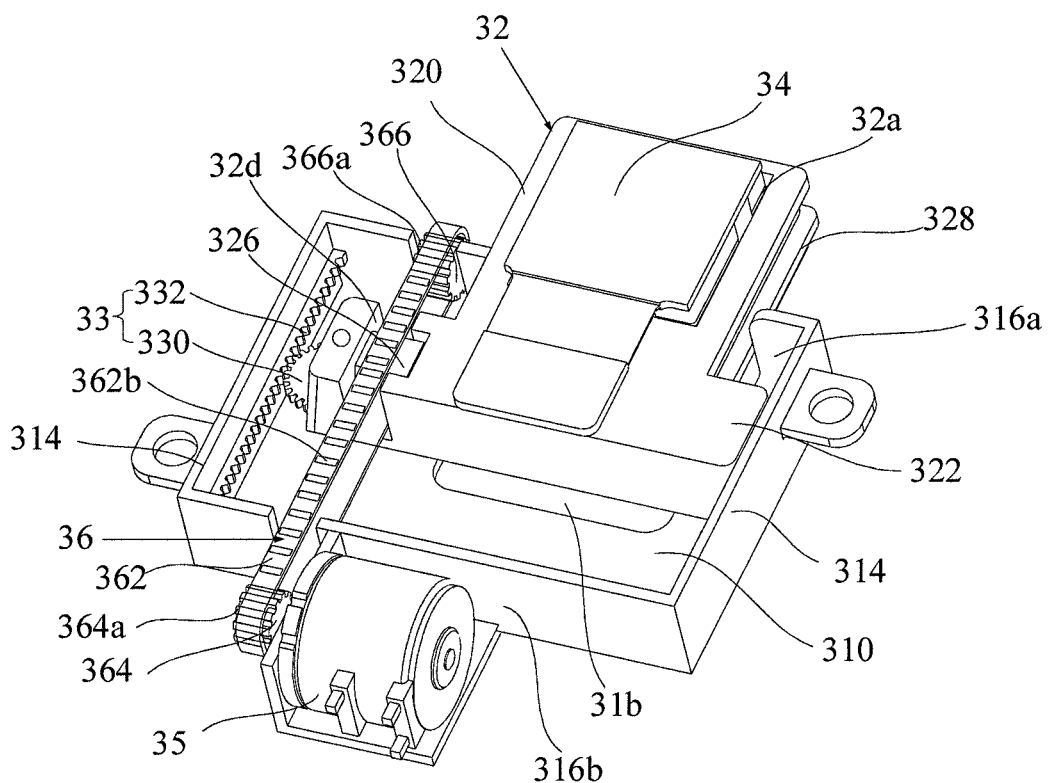
FIG. 4 is a schematic view of the camera assembly of another perspective in FIG. 3.
FIG. 5 is an isometric view of the support means in FIG. 2.

Referring to FIGS. 3-5, and combing with FIG. 1, the camera assembly 30 may include a fixed holder 31 fixed on the back shell 224, a support means 32, a guiding device 33 connecting to the fixed holder 31 and the support means 32, the camera module 34 arranged on the support means 32, a power device 35 arranged on the fixed holder 31, and a chain device 36 coupled to the support means 32 and rotatable relative to the fixed holder 31. In some embodiments, the power device may include an electrical driving device (such as a motor), a pneumatic driving device, and the like. In this embodiment, the power device 35 may be a motor. More specifically, the power device 35 may include an output coupled to the chain device 36, and configured to drive the chain device 36 to rotate, such that the support means 32 may move relative to the fixed holder 31 under the guidance of the guiding device 33. In this way, the camera module 34 could move between a first position at which the camera module 34 may extend out of the housing 22 and a second position at which the camera module 34 may retract into the housing 22 with movement of the support means 32.

In some embodiments, the fixed holder 31 may be a part of the front shell 222, the back shell 224, or other components of the electronic apparatus 100. In other embodiments, the fixed holder 31 may be a single component of the electronic apparatus 100. As shown in FIGS. 3-4, the fixed holder 31 may include a base plate 310 substantially parallel to the moving direction of the support means 32, a connecting portion 312 arranged on the base plate 310, a pair of guiding plates 314 opposite to each other, and a first stopping plate 316a and a second stopping plate 316b opposite to each other and connected between the pair of guiding plates 314.

In some embodiments, the support means 32, the guiding device 33, the camera module 34, or the like may be mounted on the base plate 312. The power device 35 may be mounted on the base plate 312, or may be mounted on any other suitable position in the electronic apparatus. The mounting position of the power device 35 may not be limited in the present disclosure.

Further referring to FIGS. 3-4, the pair of guiding plates 314 may respectively extend from two opposite sides of the base plate 312. More specifically, the pair of guiding plates 314 may be substantially perpendicular to the other end of the base plate 310 and substantially parallel to the moving direction of the support means 32.

The first stopping plate 316a and the second stopping plate 316b may respectively extend from two opposite sides of the base plate 312, and connected between the pair of guiding plates 314. More specifically, the first stopping plate 316a may extend substantially perpendicularly from one side of the base plate 310. The second stopping plate 316b may extend substantially perpendicularly from an opposite side of the base plate 310. The second stopping plate 316b and the first stopping plate 316a may be arranged substantially perpendicularly to the moving direction of the support means 32, and configured to limit the movement of the support means 32. In this embodiment, two ends of the first stopping plate 316a may be respectively connected between the pair of guiding plates 314. Likewise, two ends of the second stopping plate 316b may also be respectively connected between the pair of guiding plates 314.

The first stopping plate 316a may define a first opening 31a, through which the support means 32 along with the camera module 34 may extend out of or retract into the fixed holder 31. Further, the base plate 310 may define a second opening 31b communicating with the first opening 31a.

Referring to FIGS. 4-5, the support means 32 may include a main body 320, and an engaging portion 322 arranged on the main body 320 and connected to the chain device 36. The chain device 36 may cooperate with the engaging portion 322. In this way, when the chain device 36 rotates, the engaging portion 322, and in turn the whole support means 32 may be driven to move.

In this embodiment, it is possible to provide two engaging portions 322 on the support means 32, and the two engaging portions 322 may be arranged opposite to each other and along a direction substantially perpendicular to the moving direction of the of the support means 32.

In this embodiment, a first receiving groove 32a may be defined in the main body 320. The first receiving groove 32a may be configured to receive the camera module 34. The main body 320 may include a side wall 324 surrounding the first receiving groove 32a. The side wall 324 may define a through hole 32b for lights or other signals to penetrate to the camera module 34. For example, the through hole 32b may be a light hole for ambient light to pass through and reach the camera. An axis of the through hole 32b may substantially coincide with an optical axis of the camera module 34 and substantially perpendicular to the base plate 310 of the fixed holder 31. In this way, the camera module 34 could completely receive lights or other signals from the outside, and thus the images having higher quality may be captured.

As further shown in FIG. 5, a lens groove 32c may be defined on an outer surface of the side wall 324 that is opposite to the camera module 34. The camera assembly may further include a lens (not shown) received in the lens groove 32c and configured to cover the through hole 32b. In this way, it is possible to prevent the external impurities, such as, dust, liquid or the like, from entering into the camera module 34. In this embodiment, the lens may be completely received in the lens groove 32c. An outer surface of the lens that is away from the camera module 34 may be located at a first plane, and an outer surface of the wall enclosing the lens groove 32c may be located at a second plane. The first plane may be closer to the camera module 34 than the second plane, such that the enclosing wall of the lens groove 32c may act as a barrier to the attack from the external environment to the lens, and the possibility of damaging the lens when the electronic apparatus is falling may be effectively reduced.

Furthermore, a reinforcing rib 328 may be provided on an outer wall of the main body 320. An end of the reinforcing rib 328 may extend to the engaging portion 322, which could increase the strength of the support means 32, thereby protecting the support means 32 from being damaged during moving.

In some embodiments, as shown in FIG. 4, a chain 362 of the chain device 36 may extend through the engaging portion 322 along the moving direction of the support means 32 and be fixed with the engaging portion 322, such that the chain 362 may drive the support means 32 to move. In other embodiments, it is possible for the chain 362 to be welded on the surface of the engaging portion 322. In further embodiments, it is also possible that a protrusion protrudes from a surface of the engaging portion 322 that faces towards the chain 362, and the chain 362 may include a resisting hole matching with the protrusion. The protrusion may insert into the resisting hole, such that the engaging portion 322 may be fixed with and move along with the chain 362.

In still further embodiments, as shown in FIG. 4, the support means 32 may further include a connection body 326. The connection body 326 may be received in the engaging portion 322 and connected with the chain 362, such that the chain 362 may apply a driving force to the connection body 326 to drive the engaging portion 322 together with the main body 320 to move.

Figure 6:
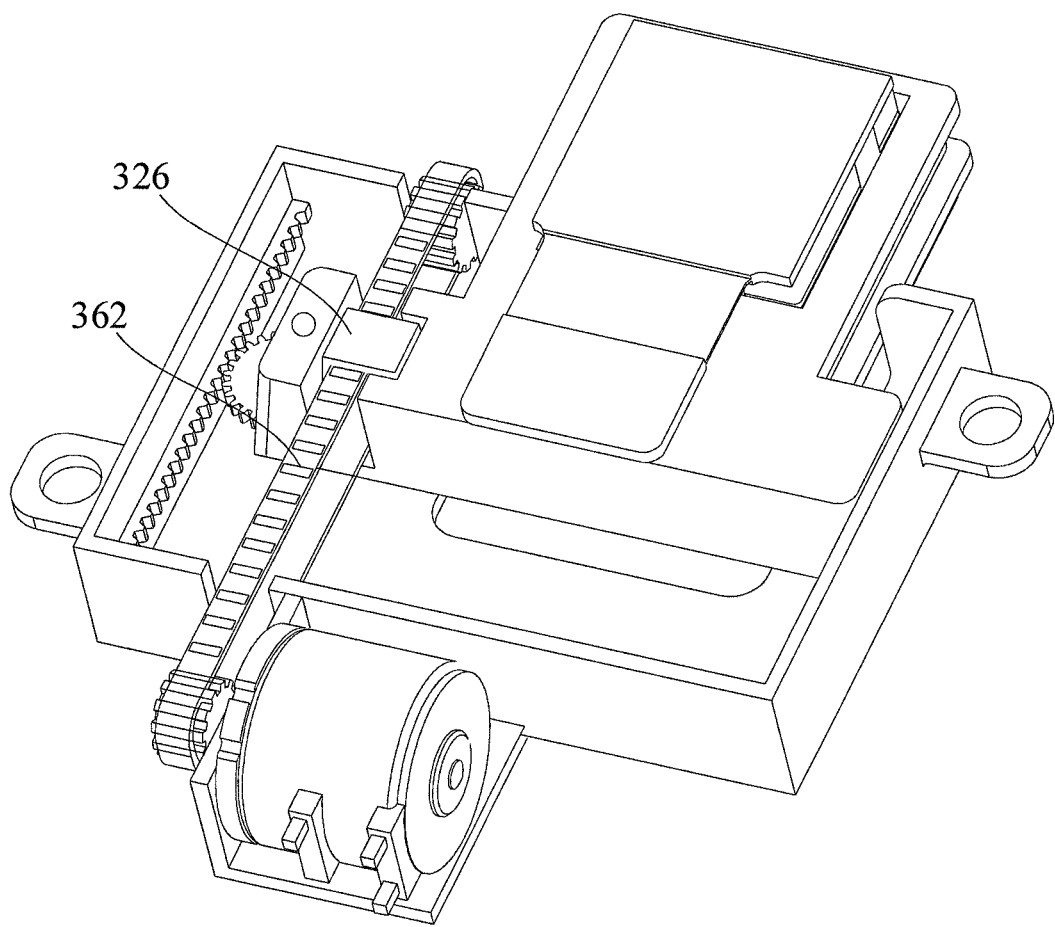
FIG. 6 is a schematic view of the camera assembly according to further embodiments of the present disclosure.
Figure 7:
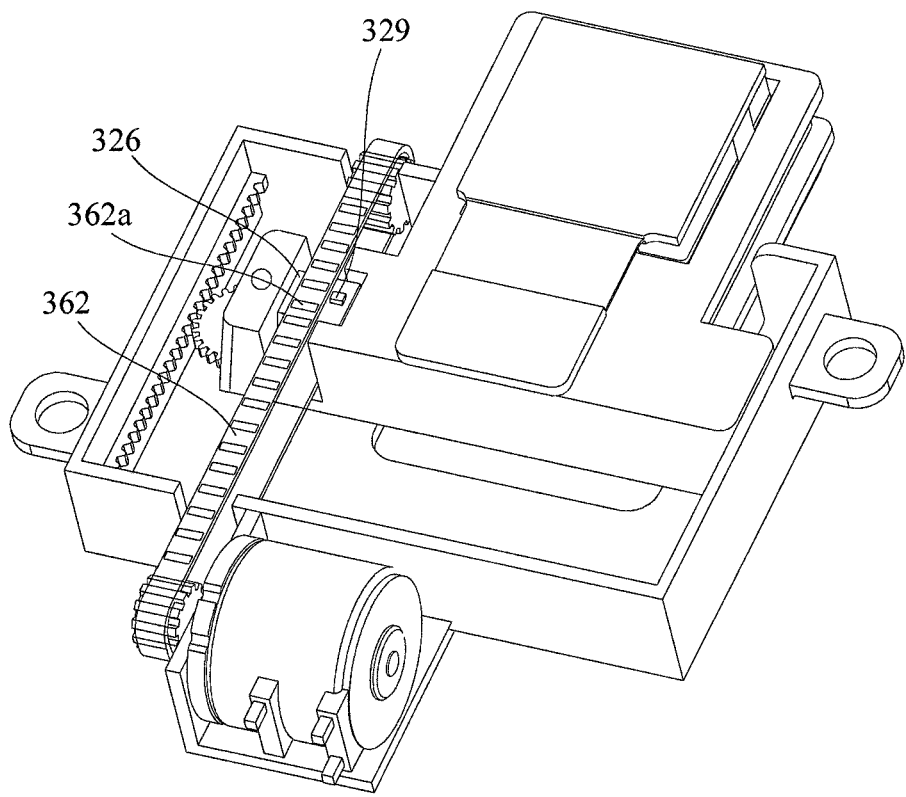
FIG. 7 is a schematic view of the camera assembly according to still further embodiments of the present disclosure.

More specifically, in some embodiments, as shown in FIG. 4 and FIG. 6, the chain 362 may extend through the connection body 326 along the moving direction of the support means 32. In other embodiments, it is possible for the chain 362 to be welded on the surface of the connection body 326. In further embodiments, as shown in FIG. 7, it is also possible that a protrusion 329 protrudes from a surface of the engaging portion 322 that faces towards the chain 362, and the chain 362 may include a resisting hole 362a matching with the protrusion 328. The protrusion 329 may insert into the resisting hole 362a, such that the connection body 326 may be fixed with and move along with the rotation of the chain 362. By providing the connection body 326, it is possible to avoid the chain 362 from directly contacting with the engaging portion 322, which in turn may prevent the oscillation caused by the movement of the support means 32 along with the rotation of the chain device 36. In some embodiments, the support means 32 may be driven to move only by the connection body 326. In this way, the support means 32 may stably move, and the camera module 34 may take the images having higher quality.

In some embodiments, referring back to FIG. 5, a second receiving groove 32d may be defined in the engaging portion 322. The connection body 326 may be received in the second receiving groove 32d, such that it is convenient to fix the connection body 326 to the engaging portion 322. A bottom wall of the second receiving groove 32d may provide a support to the connection body 326, and thus the structure of the connection body 326 may be more stable.

In further embodiments, a second through-hole (not shown) may also be defined in the engaging portion 322. The connection body 326 may be received in the second through-hole, in order to achieve the positioning and fixing of the connection body 326. By defining the second through-hole, it is possible to enlarge the receiving space for the connection body 326, and thus the connection body 326 may be designed to have a larger volume. In this way, the contact surface between the connection body 326 and the engaging portion 322 may be enlarged, and the engaging portion 322 and in turn the whole support means 32 may be applied with a more even driving force.

Referring to FIG. 4, the guiding device 33 may include a guiding gear 330 rotatably arranged on the support means 32, and a guiding rack 332 arranged on the fixed holder 31. The guiding gear 30 may be movably engaged with the guiding rack 332. That is to say, the guiding gear 330 may roll on the guiding rack 332, such that sliding stability of the support means 32 could be improved. Since the guiding gear 330 and the guiding rack 332 have a surface contact, and each of the projections of the guiding rack 332 or the guiding gear 330 may be engaged into a groove between two adjacent projections of the guiding gear 330 or the guiding rack 332, the guiding gear 330 may roll on the guiding rack 332 more stably. The engagement between the guiding gear 330 and the guiding rack 332 could prevent the support means 32 from continuing sliding due to the inertial rotation of the power device 35, which could improve the user experience.

In some embodiments, the guiding gear 330 may be hinged to the engaging portion 322 of the support means 32. Of course, in other embodiments, the guiding gear 330 may be connected to engaging portion 322 of the support means 32 by other means. For example, it is possible to provide a fixing shaft on the engaging portion 322, and the guiding gear is sleeved on the fixing shaft. The connection method between the guiding gear 330 and the engaging portion 322 will not be limited in the present disclosure.

In some embodiments, at least two guiding gears 330 may be provided, and the at least two guiding gears 330 may be distributed at two opposite sides of the support means 32. For example, two, three, or four guiding gears 330 may be provided, and the quantity of the guiding gears 330 may not be listed and limited in the present disclosure. In some embodiments, the quantity of the guiding gears 330 may be two; in this way, it is possible to improve the sliding stability of the support means 32 without occupying too much space. Corresponding, in some embodiments, two guiding racks 332 may be provided in this embodiment, and each of the guiding racks 332 may mate with two or more guiding gears 330. In other embodiments, it is also possible to provide three or more guiding racks 332, which is not limited herein.

In some embodiments, the guiding rack 332 may be arranged on the base plate 310. In other embodiments, the guiding rack 332 and the base plate 310 may be formed of a single piece. The guiding rack 332 may protrude from and substantially perpendicular to the base plate 310, such that a direction of protruding may be the same as a mould-opening or mould-closing direction during a production process of the fixed holder 31. As a result, the guiding rack 332 may not affect the removing of the fixed holder 31 from the mold. Therefore, a production cost of the fixed holder 31 could be reduced. In still other embodiments, at least one of the pair of the guiding plates 314 may be provided with such a guiding rack 332, or the guiding rack 332 may be formed of a single piece with the at least one of the pair of the guiding plates 314. Since the pair of guiding plates 314 are arranged at two opposite sides of the base plate 312 in a direction perpendicular to the moving direction of the support means 32, the guiding rack 332 and the guiding gear 330 may be arranged in the width direction of the camera module 34. In this way, the thickness of the camera assembly 30 may be reduced, and the electronic apparatus 100 could have a thinner thickness.

The camera module 34 may be arranged in the first receiving groove 32a. In some embodiments, as shown in FIG. 4, as stated above, an optical axis of the camera module 34 and a central axis of the through-hole 32b may coincide substantially with each other, such that the camera module 34 could fully receive external lights to take a higher quality image. The camera module 34 may extend out of the housing 22 or retract back into the housing 22 via the first opening 31a and the opening 22a, and the moving direction of the camera module 34 may be parallel to the back shell 14.

Figure 8:
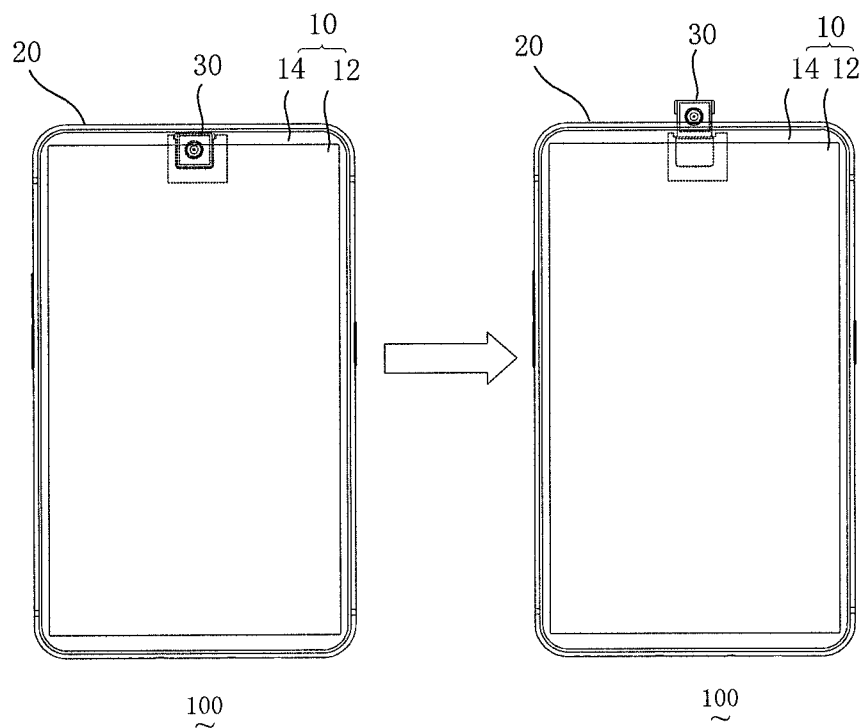
FIG. 8 is a front view of an electronic apparatus according to an embodiment of the present disclosure, wherein the camera module moves from the second position to the first position.
Figure 9:
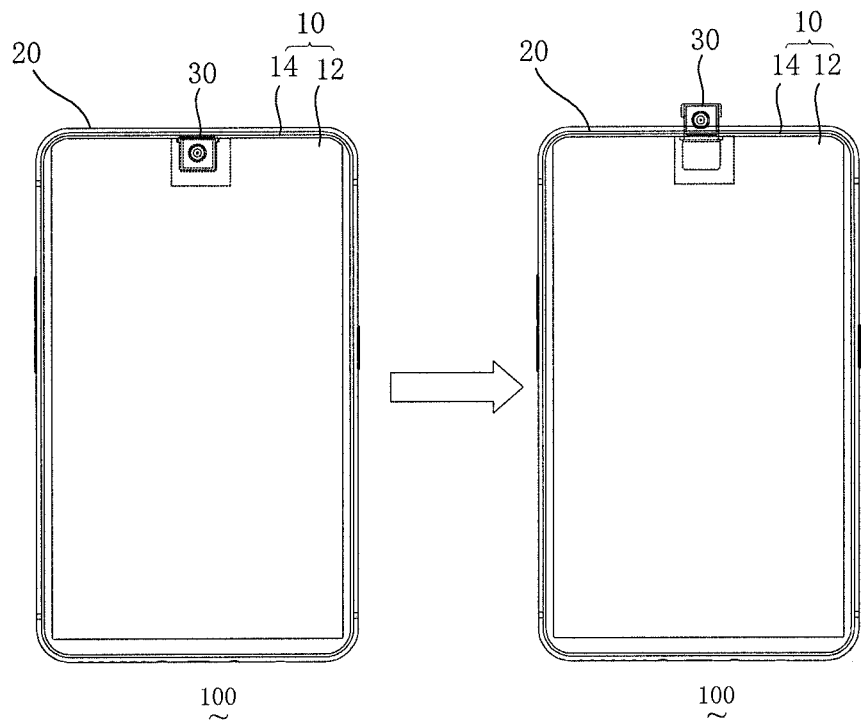
FIG. 9 is a front view of an electronic apparatus according to another embodiment of the present disclosure, wherein the camera module moves from the second position to the first position.

Referring to FIGS. 8-9, when the camera module 34 is at the first position, the camera module 34 may extend out of the housing 22 and be seen from an outside of the electronic apparatus 100, such that the camera module 34 could be used to achieve its function. In this state, the engaging portion 322 may abut against the first stopping plate 316a to stop the camera module 34 from extending.

When the camera module 34 is at the second position, the camera module 34 may retract into the housing 22 and further received in the housing 22, such that the camera module 34 could be hided under the screen 10 and cannot be seen from the outside of the electronic apparatus 100. In this way, it is possible to achieve a diversity of usages of the electronic apparatus 100, and improve the user experience. In this state, the engaging portion 322 may abut against the second stopping plate 316b to stop the camera module 34 from retracting. Furthermore, when the camera module 34 is at the second position, the camera module 34 may be disposed under the display area 12 of the screen 10, such that at least part of the camera module 34 may be covered by the screen 10.

When the camera module 34 is at the second position, in some embodiment, part of the camera module 34 may be covered by the display area 12 of the screen 10, the other part of the camera module 34 may be covered by the non-display area 14 of the screen 10 (shown in FIG. 8). In other embodiments, whole of the camera module 34 may be covered by the display area 12 of the screen 10 (shown in FIG. 9).

Since the camera module 34 is disposed in the housing 22 and under the screen 10, the camera module 34 may no longer occupy any space of the display area 12, such that the display area 12 could be designed as large as possible, and thus a ratio of the display area 12 to a total area of the screen 10 could be increased. In addition, the volume of the electronic apparatus 100 could be reduced, thereby carrying or gripping the electronic apparatus 100 could be more convenient.

When the camera module 34 is at the second position, parts of the support means 32 may be received in the second opening 31b. Furthermore, the support means 32 may protrude out of the base plate 310 through the second opening 31b. Therefore, the thickness of the fixed holder 31 could be thinner than that of the support means 32. As a result, the space occupied by the camera assembly 30 could be reduced.

The power device 35 may be disposed in the electronic apparatus. In some embodiments, as shown in FIG. 4, the power device 35 may be fixed on the base plate 312, and close to the second stopping plate 316b. The power device 35 may further comprise an output end. The output end may be coupled to the chain device 36, and configured to drive the chain device 36 to rotate, such that the chain device 36 may apply a force to drive the support means 32 to move, and thus the support means 32 is capable of moving stably with the guidance of the guiding device 33. In this way, the camera module 34 may move between the first position and the second position.

In some embodiments, as mentioned above, the power device may be a motor. Taking motor as an example in the following, the motor may be rotated in the energized state, and the rotating direction of the motor can be changed based on the current direction, such that the chain device 36 may be rotated in the forward direction or in the reverse direction, and the chain device 36 may apply a force to the support means 32 to drive the support means 32 to move away from the motor or move close to the motor. In addition, the rotation speed of the motor may be determined based on the amount of the current, thereby causing the chain device 36 to drive the support means 32 to move at different speeds.

In some embodiments, as shown in FIG. 4, the chain device 36 may include the chain 362, a driving gear 364, and a follower gear 366. More specifically, the driving gear 364 may be coupled to the output end of the motor, and the follower gear 366 may be rotatably connected to the fixed holder 31 by means of such as a hinge. The chain 362 may be engaged with both the driving gear 364 and the follower gear 366, and further connected to the engaging portion 322 of the support means 32.

In some embodiments, as further shown in FIG. 4, the chain 362 may include multiple mating holes 362b. The driving gear 364 may include a first toothed protrusion 364a, while the follower gear 366 may include a second toothed protrusion 366a. The chain 362 may extend through the engaging portion 322 of the support means 32, while the first toothed protrusion 364a and the second toothed protrusion 366a may mate with or insert into the corresponding mating holes 362b. In this way, during the operation, the motor 35 may drive the driving gear 364 to rotate, the driving gear 364 may in turn drive the chain 362 to rotate by means of the interaction between the first toothed protrusion 364a and the mating hole 362b, the chain 362 may further drive the follower gear 366 to rotate by means of the interaction between the second toothed protrusion 366a and the mating hole 362b. In this way, the chain 362 may drive the whole support means 32 to move. In this embodiments, the interaction between the first toothed protrusion 364a and the mating hole 362b, and that between the second toothed protrusion 366a and the mating hole 362b may increase the transmission forces between the chain 362 and the driving gear 364, and between the chain 362 and the follower gear 366. Therefore, it is possible to prevent the slipping of the chain 362 on the driving gear 364 and the follower gear 366.

In some embodiments, the controller 40 may be configured to control the rotating direction of the motor based on the current direction, or control the rotation speed of the motor based on the amount of the current. When the camera module 34 is at the second position, the camera module 34 may be positioned between the first stopping plate 316a and the second stopping plate 316b. When the user inputs an instruction of starting the camera module 34, the controller 40 may control the direction of current provided to the motor, such that the motor may rotate along a first direction, and the support means 32 may be driven to move away from the second stopping plate 316b along the guiding rack 332, and thus the camera module 34 may move to the first position.

However, after using the camera module 34, the user may input an instruction of turning off the camera module 34, the controller 40 may change direction of current provided to the motor, such that the motor may rotate in a second direction opposite to the first direction, and the support means 32 may be driven to move towards the second stopping plate 316b along the guiding rack 332, and thus the camera module 34 may move to the second position.

Figure 10:
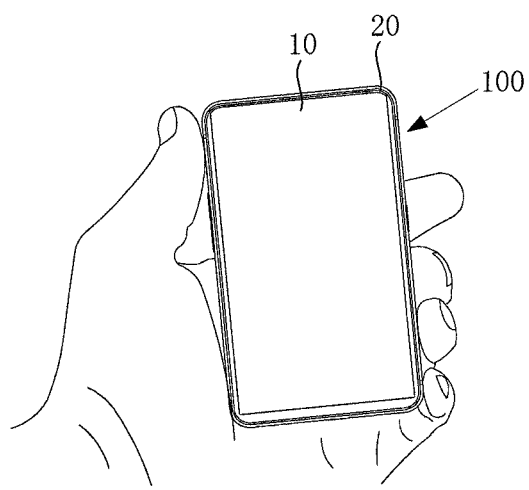
FIG. 10 is a schematic view of an electronic apparatus according to a further embodiment of the present disclosure, wherein the camera module is at the second position.
Figure 11:
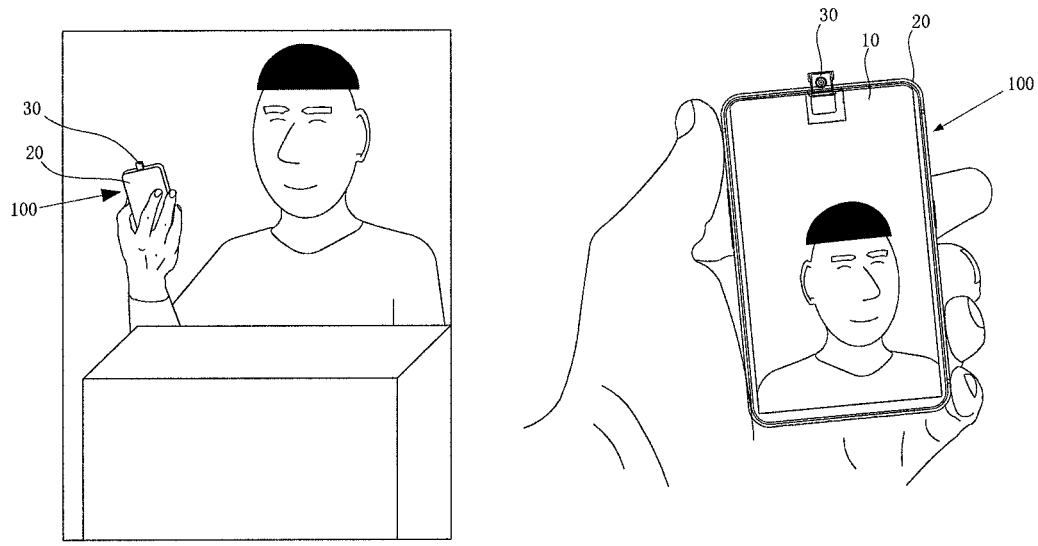
FIG. 11 is a schematic view of an electronic apparatus according to some embodiments of the present disclosure, wherein the module is being used to take images and at the first position.

Take the camera for taking pictures as an example, referring to FIG. 10, when the camera module 34 is not being used, the camera assembly 30 may be disposed in the housing 22 and hided under the screen 10. When a user wants to take images, he may input an instruction of taking images to the electronic apparatus 100. Then the camera module 34 may be driven to extend out of the housing 22 via the housing opening 22a, and an image taking function may be achieved as a result, as shown in FIG. 11. Therefore, the camera module 34 will not occupy the space of the screen 10, and it is unnecessary to define a hole for the camera module 34 on the cover layer of the screen 10. In this way, a ratio of the display area 12 to an area of the screen 10 may be increased, appearance beauty of the whole electronic apparatus may be improved, and manufacturing processes of the screen 10 may be reduced. After finishing taking images, the motor may drive the camera module 34 to retract into the housing 22 via the housing opening 22a, and thus the camera module 34 may be protected from being impacted, damaged, eroded by water or dust, or the like.

Figure 12:
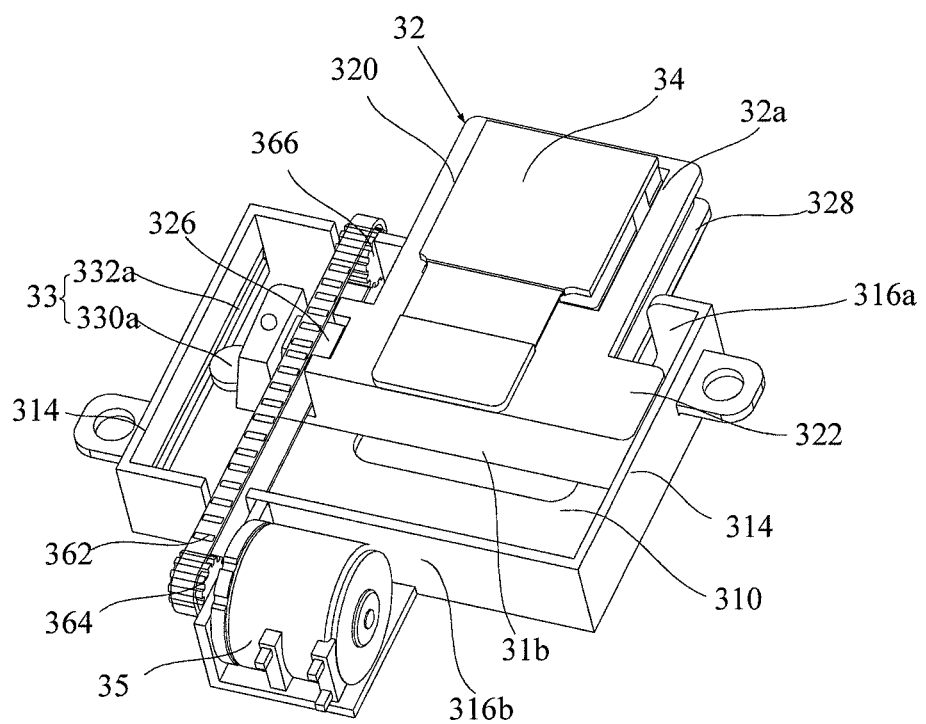
FIG. 12 is a schematic view of the camera assembly of the electronic apparatus according to some embodiments of the present disclosure.

Referring to FIG. 12, in some embodiments, the guiding device 33b may include a roller 330a rotatably connected to at least one of the engaging portions 322 and a guiding slot 332a defined in at least one of the pair of the guiding plates 314 of the fixed holder 31. The roller 330a may roll in the guiding slot 332a to guide the movement of the support means 32, such that sliding stability of the support means 32 could be improved. Since a friction between the roller 330a and the guiding slot 332a is a rolling friction and magnitude of the rolling friction may be smaller than that of a sliding friction, energy loss may be effectively reduced.

In some embodiments, only one guiding slot 332a is defined in one of the pair of guiding plates 314, and correspondingly, only one roller is provided. The other of the pair of guiding plates 314 may be provided with the guiding rack 332 as recited above. Thus, a corresponding guiding gear 330 engaged with the guiding rack 332 may be arranged on the other of the engaging portions 322 adjacent to the guiding rack 332. That is to say, both the guiding rack and the guiding gear, and the roller and guiding slot may be provided in the same camera assembly.

Of course, in other embodiments, two rollers 330a may be provided, and two guiding slots 332a may also be provided. The two rollers 330a mating with two guiding slot 332a could improve the sliding stability of the support means 32 without occupying too much space. In other embodiments, each of the guiding slots 332a may mate with two or more rollers 330a. In still other embodiment, three or more guiding slots 332a may be provided, which is not limited herein.

In some embodiments, the guiding slot 332a may be defined in the base plate 310. In other embodiments, the guiding slot 332a may be defined in at least one of the pair of guiding plates 314. In some embodiments, the guiding slot 332a may be directly defined in the base plate 310 or at least one of the pair of guiding plates 314; that is to say, the guiding slot 332a and the base plate 310 or at least one of the pair of guiding plates 314 may be formed of a single piece. In other embodiments, it is also possible to mount a component having a guiding slot 332a defined therein on the base plate 310 or at least one of the pair of guiding plates 314. The arrangement of the guiding slot 332a may be similar to the guiding rack 332, and will not be described in detail any more.

Figure 13:
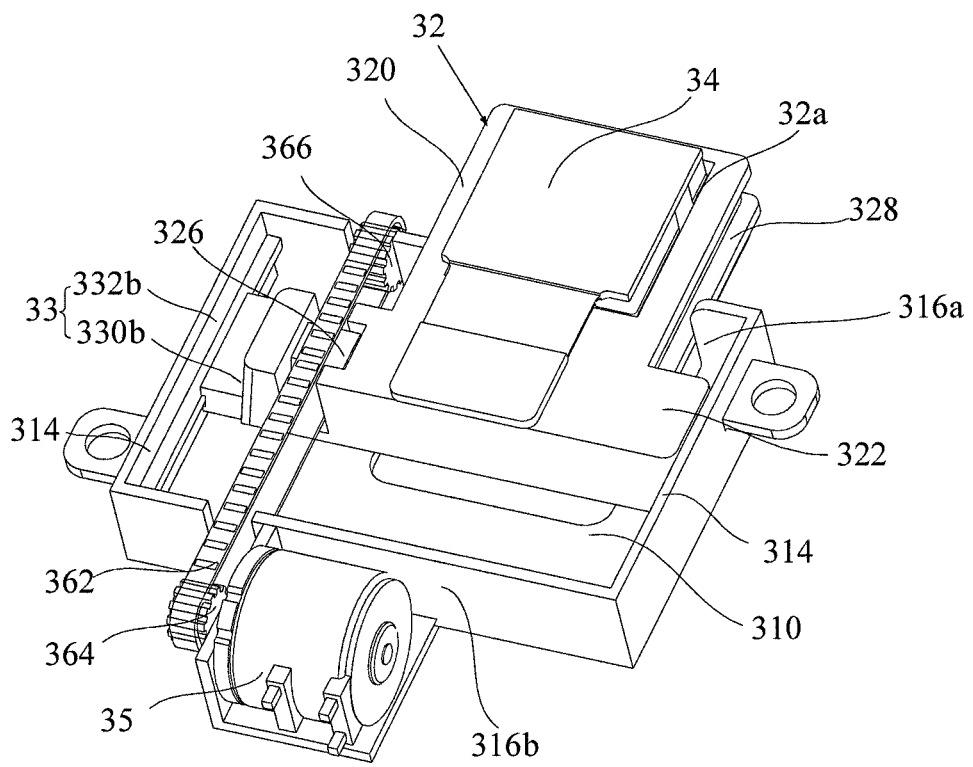
FIG. 13 is a schematic view of the camera assembly of the electronic apparatus according to further embodiments of the present disclosure.

Referring to FIG. 13, in still other embodiments, the guiding device 33 may include a guiding rail 332b and a sliding block 330b matching with the guiding rail 332b. In some embodiments, the guiding rail 332b may be arranged on the base plate 310 of the fixed holder 31, and the sliding block 330b may be arranged on the engaging portion 322 of the support means 32. The sliding block 330b may be slidable along the guiding rail 332b, thereby improving the sliding stability of the support means 32. Since the surfaces of the sliding block 330b along the moving direction of the support means 32 always contact with the guiding rail 332b, and the sliding block 330b may be engaged in the guiding rail 332b, the guiding rail 332b may well support the sliding block 330b. In this way, the sliding block 330b may stably slide along the guiding rail 332b, and the support means 32 may stably slide under the guidance of the sliding block 330b and the guiding rail 332b. In this way, the oscillation of the camera module 34 may be reduced, and the lift time of the camera module 34 and the quality of taking pictures may be improved.

In some embodiments, only one guiding rail 332b is arranged on one of the pair of guiding plates 314, and correspondingly, only one sliding block 330b is provided. The other of the pair of guiding plates 314 may be provided with the guiding rack 332 as recited above. Thus, a corresponding guiding gear 330 engaged with the guiding rack 332 may be arranged on the other of the engaging portions 322 adjacent to the guiding rack 332. That is to say, both the guiding rack and the guiding gear, and the guiding rail and sliding block 330b may be provided in the same camera assembly.

Of course, in other embodiments, at least two sliding blocks 330b may be provided, and the at least two guiding rails 332b may be distributed at two opposite sides of the support means 32. For example, two, three, or four sliding blocks 330b may be provided, and the quantity of the sliding blocks 330b may not be listed and limited in the present disclosure. In some embodiments, the quantity of the sliding blocks 330b may be two; in this way, it is possible to improve the sliding stability of the support means 32 without occupying too much space. Corresponding, in some embodiments, two guiding rails 332b may be provided in this embodiment, and each of the guiding rails 332b may engage with two or more sliding blocks 330b. In other embodiments, it is also possible to provide three or more sliding blocks 330b, which is not limited herein. The arrangement of the guiding rail 332b may be similar to the sliding block 330b, and will not be described in detail any more.

Figure 14:
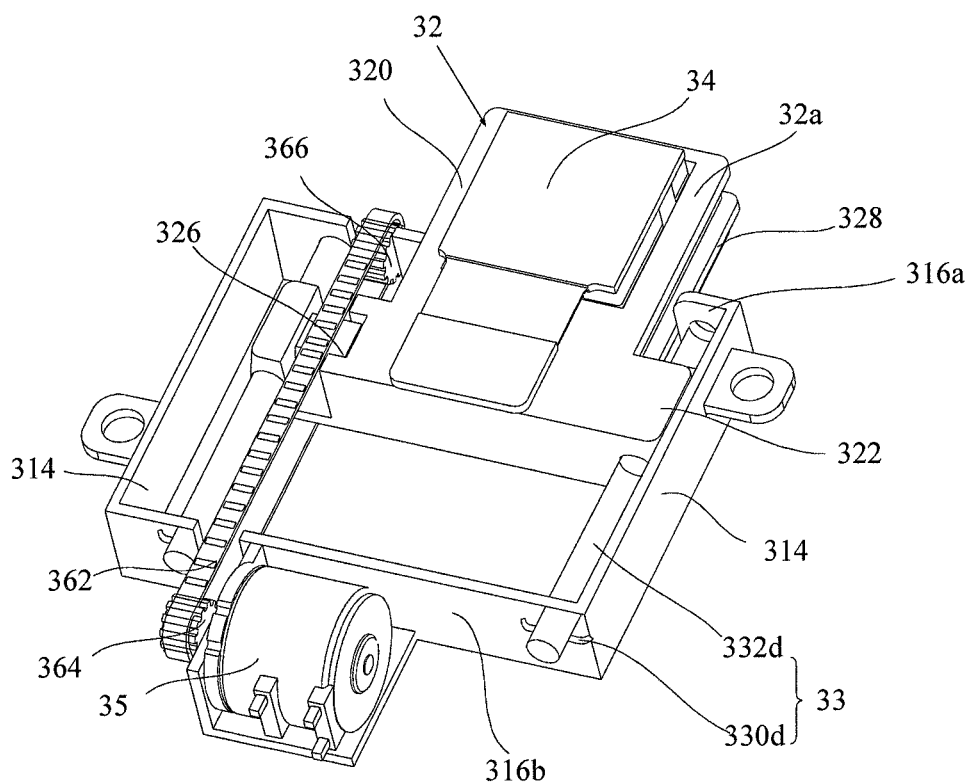
FIG. 14 is a schematic view of the camera assembly of the electronic apparatus according to still further embodiments of the present disclosure.

Referring to FIG. 14, in further embodiments, the guiding device 33 may include a guiding rod 332d. In some embodiments, the guiding rod 332d may extend through the engaging portion 322 of the support means 32, and fixedly connected to the fixed holder 31. The support means 32 may slide along the guiding rod 332d, thereby improving the sliding stability of the support means 32. During the sliding of the support means 32 along the guiding rod 332d, the surfaces of the support means 32 always contact with the guiding rail 332b, the guiding rod 332d may well support the support means 32. In this way, the support means 32 may stably slide along the guiding rod 332d, and the support means 32 may stably slide under the guidance of the guiding rod 332d. In this way, the oscillation of the camera module 34 may be reduced, and the lift time of the camera module 34 and the quality of taking pictures may be improved.

In some embodiments, only one guiding rod 332d is provided on one of the engaging portion 322. The other engaging portion is provided with the guiding gear 330 as recited above; and one of the pair of guiding plates 314 may be provided with the guiding rack 332 engaged with the guiding gear 330 adjacent to the guiding gear 330. That is to say, both the guiding rack and the guiding gear, and the guiding rod 332d may be provided in the same camera assembly.

Of course, in other embodiments, at least two guiding rods 332d may be provided, and the at least two guiding rods 332d may be distributed at two opposite sides of the support means 32. For example, two, three, or four guiding rods 332d may be provided, and the quantity of the guiding rods 332d may not be listed and limited in the present disclosure. In some embodiments, the quantity of the guiding rods 332d may be two; in this way, it is possible to improve the sliding stability of the support means 32 without occupying too much space. Furthermore, in some embodiments, the guiding rod 332d may be in shape of a circle, which may reduce the friction forces between the support means 32 and the guiding rod 332d. In further embodiments, the guiding rod 332d may also be in shape of a square, which may provide a limitation to the support means 32.

The guiding device 33 may further include a blocking member 330d, and both ends of the guiding rod 332d may pass through and further extend out of the fixed holder 31. The blocking member 330d may be cooperated with an end of the guiding rod 332d to prevent the guiding rod 332d from falling off the fixed holder 31. In some embodiment, the blocking member 330d may be a nut, and the nut is threadedly engaged with the end of the guiding rod 332d. In other embodiments, the blocking member 330d may also be glue, and the solidified glue may fix the guiding rod 332d and the stopping plates 316a and 316b more firmly. In further embodiments, the blocking member 330d may also be a blocking rod, and the blocking member 330d may be disposed at the end of the guiding rod 332d. Further, the blocking member 330d may be in shape of an elongated cylinder, and both ends of the blocking member 330d are bent to prevent the blocking member 330d from falling off from the end of the guiding rod 332d.

Of course, in other embodiments, the camera assembly of the present disclosure may use or combine two different kinds guiding structures. The guiding structures may be selected from a group consisting of the guiding rack and guiding gear, the roller and guiding slot, the guiding rail and sliding block, and the guiding rod. Therefore, the guiding structures used in the camera assembly may not be limited here.

Figure 15:
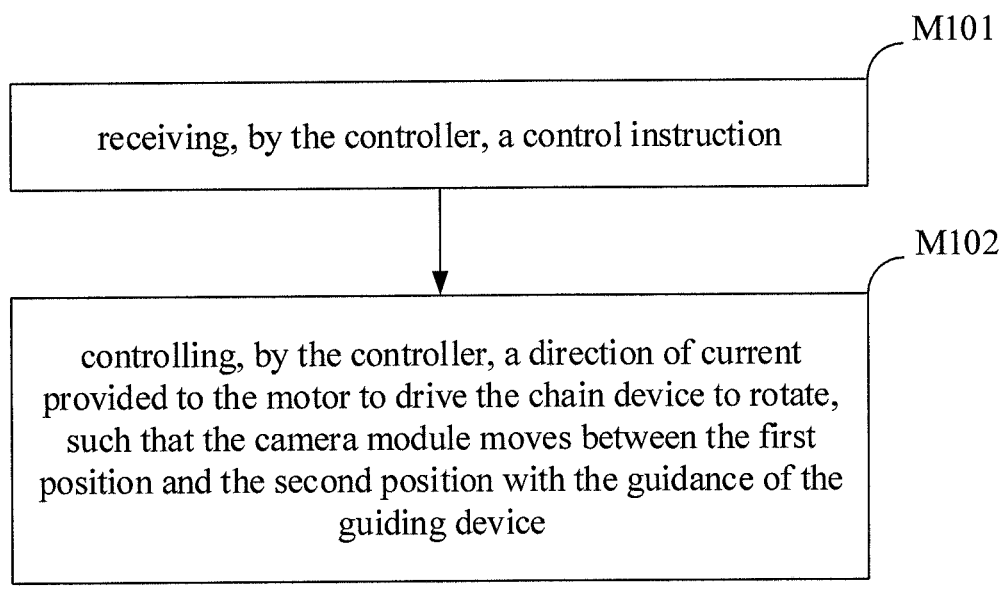
FIG. 15 is a flow chart diagram of a method for controlling a camera assembly of an electronic apparatus according to an embodiment of the present disclosure.

Referring to FIG. 15, the present disclosure may further provide a method for controlling a camera assembly of an electronic apparatus. The electronic apparatus may be any one of the electronic apparatus mentioned above, the details are not recited herein. In this embodiment, the power device 35 may be the motor.

In an embodiments, the method may include:

M101: receiving, by the controller, a control instruction.

At the block M101, the control instruction may include a start-taking pictures instruction, a stop-taking pictures instruction, a start-video chat instruction, a stop-video chat instruction, a start-videotaping instruction, a stop-videotaping instruction or other instruction executed by the camera module.

M102: controlling, by the controller, a direction of current provided to the motor to drive the chain device to rotate, such that the camera module moves between the first position and the second position with the guidance of the guiding device 33.

For example, when the controller receives a start-taking pictures instruction, the controller may control the direction of the current such that the motor may rotate along the first direction. The support means 32 may be driven to move away from the second stopping plate 316a, meanwhile the guiding gear 330 may roll on the guiding rack 332 (as shown in FIG. 4), or the roller 330a may roll on the guiding slot 332a (as shown in FIG. 12), or the sliding block 330b may slide along the guiding rails 332b (as shown in FIG. 13), or the support means 32 may slide along the guiding rod 332d (as shown in FIG. 14), so as to guide the support means 32 to move. In this way, the camera module 34 arranged on the support means 32 could move from the second position to the first position with the movement of the support means 32.

According to an aspect of the present disclosure, a mobile terminal may be further provided. The mobile terminal may include a front shell, a back shell connected to the front shell, a screen embedded in the front shell and covering the back shell, a fixed holder fixed on the back shell, and a support means. The support means may be configured to move relative to the fixed holder. The support means may include a main body defining a first receiving groove configured to receive the camera module, and an engaging portion arranged on the main body. The mobile terminal may further include a camera module. The camera module may be arranged on the support means and configured to move between a first position at which the camera module extends out of the fixed holder and a second position at which the camera module retracts into the fixed holder with movement of the support means. The mobile terminal may further include a chain device. The chain device may be coupled to the fixed holder and the support means, and rotatable relative to the fixed holder. The chain device may include a chain the chain extends through the engaging portion along a moving direction of the support means, such that the engaging portion is driven to move during the rotation of the chain. The mobile terminal may further include a power device. The power device may further inldue an output end coupled to the chain device and configured to drive the chain device to rotate, such that the camera module moves between the first position and the second position.

For one skilled in the art, it is clear that the present application is not limited to the details of the above exemplary embodiments, and that the present application can be implemented in other specific forms without deviating from the spirit or basic characteristics of the application. Therefore, at any point, the embodiments should be regarded as exemplary and unrestrictive, and the scope of the present application is defined by the appended claims, rather than the above description. Therefore, all changes within the meaning and scope of the equivalent elements of the claim is intended to be included. Any appended label recited in the claims shall not be regarded as a limitation to the claims. In addition, apparently, the terms "include", "comprise" or the like do not exclude other units or steps, and the singular does not exclude plural.

It should be noted that, the foregoing disclosed is merely exemplary implementations and it is not intended to limit the scope of the present disclosure. Although the present disclosure is described in details with reference to the above embodiments, however, one skilled in the art may make any modification or equivalence based on the technical solution and the inventive concept of the present disclosure. All these modifications and equivalences shall all be covered within the protection claimed in the claims of the present disclosure.

What is claimed is:

1. A camera assembly, comprising:
   a fixed holder;
   a support means, configured to move relative to the fixed holder wherein the support means comprises;
   a main body, defining a first receiving groove configured to receive the camera module, and
   an engaging portion, arranged on the main body and connected to the chain device, such that the engaging portion is driven to move during the rotation of the chain device;
   a camera module, arranged on the support means and configured to move between a first position at which the camera module extends out of the fixed holder and a second position at which the camera module retracts into the fixed holder with movement of the support means;
   a chain device, coupled to the fixed holder and the support means, and rotatable relative to the fixed holder;
   a power device, comprising an output end coupled to the chain device and configured to drive the chain device to rotate, such that the camera module moves between the first position and the second position; and
   a guiding gear, rotatably coupled to the engaging portion.

2. The camera assembly of claim 1, wherein the chain device comprises:
   a driving gear, coupled to the output end of the power device;
   a follower gear, rotatably connected to the fixed holder; and
   a chain, engaged with both the driving gear and the following gear, and connected to the engaging portion.

3. The camera assembly of claim 2, wherein the chain extends through the engaging portion along a moving direction of the support means, and the support means is capable of moving along with the rotation of the chain.

4. The camera assembly of claim 2, wherein the support means further comprises a connection body received in the engaging portion and connected with the chain, such that the connection body is capable of driving the engaging portion together with the main body to move.

5. The camera assembly of claim 4, wherein a protrusion protrudes from a surface of the connection body that faces towards the chain, and the chain comprises a resisting hole matching with the protrusion; the protrusion inserts into the resisting hole.

6. The camera assembly of claim 4, wherein the chain extends through the connection body along the moving direction of the support means.

7. The camera assembly of claim 2, wherein a second receiving groove or a through hole configured to receive the connection body is defined in the engaging portion.

8. The camera assembly of claim 1, wherein the fixed holder comprises:
   a base plate, substantially parallel to a moving direction of the support means; and
   a pair of guiding plates, extending from two opposite sides of the base plate;

wherein the pair of guiding plates are substantially parallel to the moving direction of the support means and substantially perpendicular to the base plate.

9. The camera assembly of claim 8, wherein the base plate or at least one of the pair of the guiding plates is provided with a guiding rack; the guiding gear is movably engaged with the guiding rack, the guiding gear is rotatably arranged on the support means.

10. The camera assembly of claim 8, wherein a quantity of the engaging portions is two, the engaging portions are arranged opposite to each other and along a direction substantially perpendicular to the moving direction of the of the support means;
   one of the engaging portions is provided with the guiding gear, and the guiding rack is arranged on one of the pair of the guiding plates that is adjacent to the guiding gear.

11. The camera assembly of claim 10, wherein
   the other of the engaging portions is provided with a guiding rail, and a guiding rail is arranged on the other of the pair of the guiding plates that is adjacent to the guiding rail; the sliding block is slidable along the guiding rail; or
   the other of the engaging portions is provided with a roller, and a guiding slot is defined in the other of the pair of the guiding plates that is adjacent to the roller; the roller is slidable along the guiding slot and rotatably connected to the other of the engaging portions; or
   a guiding rod extends through the other of the engaging portions and fixedly connected to the fixed holder; the support means is slidable along the guiding rod.

12. The camera assembly of claim 8, wherein the fixed holder further comprises a first stopping plate and a second stopping plate extending from two opposite sides of the base plate and connected between the pair of guiding plates;
   wherein the first stopping plate and the second stopping plate are separately arranged substantially perpendicularly to the moving direction of the support means; a first opening is defined in the first stopping plate, and the camera module extends out of or retracts into the fixed holder through the first opening;
   when the camera module is at the first position, the engaging portion abuts against the first stopping plate.

13. The camera assembly of claim 12, wherein a second opening communicating with the first opening is further defined in the base plate; the support means protrudes out of the base plate through the second opening.

14. An electronic apparatus, comprising:
   a housing assembly, comprising a housing;
   a screen, embedded in the housing; and
   a camera assembly, arranged in the housing and comprising:
     a fixed holder;
     a support means, configured to move relative to the fixed holder;
     a camera module, arranged on the support means and configured to move between a first position at which the camera module extends out of the fixed holder and a second position at which the camera module retracts into the fixed holder with movement of the support means;
     a chain device, coupled to the fixed holder and the support means, and rotatable relative to the fixed holder; and
     a power device, comprising an output end coupled to the chain device and configured to drive the chain device to rotate, such that the camera module moves between the first position and the second position;
   wherein the fixed holder comprises:
     a base plate, substantially parallel to a moving direction of the support means; and
     a pair of guiding plates, extending from two opposite sides of the base plate;
     wherein the pair of guiding plates are substantially parallel to the moving direction of the support means and substantially perpendicular to the base plate.

15. The electronic apparatus of claim 14, wherein the housing defines an opening through which the camera module extends out or retract into the housing;
   the housing assembly further comprises a dustproof plate connected to the housing and configured to cover the opening when the camera module is at the second position;
   the dustproof plate is connected to the housing by a rebound hinge; when the camera module is at the first position, the dustproof plate is pushed by the support means, when the camera module is at the second position, the dustproof plate is bounced back to cover the opening.

16. The electronic apparatus of claim 14, wherein the support means comprises:
   a main body, defining a first receiving groove configured to receive the camera module; and
   an engaging portion, arranged on the main body and connected to the chain device, such that the engaging portion is driven to move during the rotation of the chain device; and wherein a guiding gear is rotatably coupled to the engaging portion.

17. The electronic apparatus of claim 16, the support means further comprises a connection body received in the engaging portion and connected with the chain, such that the connection body is capable of driving the engaging portion together with the main body to move;
   a protrusion protrudes from a surface of the connection body that faces towards the chain, the chain comprises a resisting hole matching with the protrusion, and the protrusion inserts into the resisting hole; or the chain extends through the connection body along a moving direction of the support means.

18. The electronic apparatus of claim 16, wherein
   a quantity of the engaging portions is two, the engaging portions are arranged opposite to each other and along a direction substantially perpendicular to the moving direction of the of the support means;
   one of the engaging portions is provided with the guiding gear, and the guiding rack is arranged on one of the pair of the guiding plates that is adjacent to the guiding gear; and
   the other of the engaging portions is provided with a guiding rail, and a guiding rail is arranged on the other of the pair of the guiding plates that is adjacent to the guiding rail; the sliding block is slidable along the guiding rail; or
   the other of the engaging portions is provided with a roller, and a guiding slot is defined in the other of the pair of the guiding plates that is adjacent to the roller; the roller is slidable along the guiding slot and rotatably connected to the other of the engaging portions; or
   a guiding rod extends through the other of the engaging portions and fixedly connected to the fixed holder; the support means is slidable along the guiding rod.

19. A mobile terminal, comprising:
   a front shell;
   a back shell, connected to the front shell;

a screen, embedded in the front shell and covering the back shell;
a fixed holder, fixed on the back shell;
a support means, configured to move relative to the fixed holder and comprising:
 a main body, defining a first receiving groove configured to receive the camera module; and
 an engaging portion, arranged on the main body;
a camera module, arranged on the support means and configured to move between a first position at which the camera module extends out of the fixed holder and a second position at which the camera module retracts into the fixed holder with movement of the support means;
a chain device, coupled to the fixed holder and the support means, and rotatable relative to the fixed holder; the chain device comprising a chain the chain extends through the engaging portion along a moving direction of the support means, such that the engaging portion is driven to move during the rotation of the chain;
a power device, comprising an output end coupled to the chain device and configured to drive the chain device to rotate, such that the camera module moves between the first position and the second position; and
a guiding gear, rotatably coupled to the engaging portion.

20. The mobile terminal of claim 19, wherein the fixed holder comprises:
 a base plate, substantially parallel to a moving direction of the support means; and
 a pair of guiding plates, extending from two opposite sides of the base plate;
wherein the pair of guiding plates are substantially parallel to the moving direction of the support means and substantially perpendicular to the base plate; a quantity of the engaging portions is two, the engaging portions are arranged opposite to each other and along a direction substantially perpendicular to the moving direction of the of the support means;
one of the engaging portions is provided with the guiding gear, and the guiding rack is arranged on one of the pair of the guiding plates that is adjacent to the guiding gear; and
the other of the engaging portions is provided with a guiding rail, and a guiding rail is arranged on the other of the pair of the guiding plates that is adjacent to the guiding rail; the sliding block is slidable along the guiding rail; or
the other of the engaging portions is provided with a roller, and a guiding slot is defined in the other of the pair of the guiding plates that is adjacent to the roller; the roller is slidable along the guiding slot and rotatably connected to the other of the engaging portions; or
a guiding rod extends through the other of the engaging portions and fixedly connected to the fixed holder; the support means is slidable along the guiding rod.

* * * * *